United States Patent
Aschenbrenner

(10) Patent No.: US 7,297,866 B2
(45) Date of Patent: Nov. 20, 2007

(54) VENTILATED PHOTOVOLTAIC MODULE FRAME

(75) Inventor: Peter Aschenbrenner, Palo Alto, CA (US)

(73) Assignee: Sunpower Corporation, San Jose, CA (US)

(*) Notice: Subject to any disclaimer, the term of this patent is extended or adjusted under 35 U.S.C. 154(b) by 568 days.

(21) Appl. No.: 10/801,182

(22) Filed: Mar. 15, 2004

(65) Prior Publication Data

US 2005/0199278 A1    Sep. 15, 2005

(51) Int. Cl.
*H01L 31/052* (2006.01)
(52) U.S. Cl. ............... 136/246; 136/243; 52/173.3
(58) Field of Classification Search ............... 136/246; 52/173.3
See application file for complete search history.

(56) References Cited

U.S. PATENT DOCUMENTS

| | | | |
|---|---|---|---|
| 4,942,865 A | 7/1990 | Pierce-Bjorklund | |
| 5,338,369 A * | 8/1994 | Rawlings | 136/246 |
| 5,571,338 A | 11/1996 | Kadonome et al. | |
| 5,589,006 A | 12/1996 | Itoyama | |
| 5,951,785 A * | 9/1999 | Uchihashi et al. | 136/251 |
| 6,061,978 A | 5/2000 | Dinwoodie et al. | |
| 6,105,316 A | 8/2000 | Bottger et al. | |
| 6,111,189 A | 8/2000 | Garvison et al. | |
| 6,342,669 B1 | 1/2002 | Sakai et al. | |
| 6,360,491 B1 | 3/2002 | Ullman | |
| 6,410,843 B1 | 6/2002 | Kishi et al. | |
| 6,465,724 B1 | 10/2002 | Garvison et al. | |
| 6,552,258 B2 | 4/2003 | Kinoshita et al. | |
| 2002/0046506 A1 | 4/2002 | Ullman | |
| 2003/0101662 A1 | 6/2003 | Ullman | |
| 2003/0111103 A1 | 6/2003 | Bower et al. | |

OTHER PUBLICATIONS

PCT International Search Report for Application No. PCT/US2005/05278 (2 sheets), 2007.
SANYO Hit Photovoltaic Module, HIP-J54BE2 (2 sheets), year not available.

* cited by examiner

*Primary Examiner*—Alex Noguerola
*Assistant Examiner*—Anthony Fick
(74) *Attorney, Agent, or Firm*—Okamoto & Benedicto LLP

(57) ABSTRACT

In one embodiment, a photovoltaic frame assembly comprises a photovoltaic module and a frame having a plurality of air vents. The air vents allow air to flow into the frame and thereby cool the photovoltaic module. The frame may be installed in-line with another such frame to allow air flow between frames. The air vents may be located within a perimeter of the frame to allow for structural integrity while remaining aesthetically pleasing. The frame may include an inner lip, an outer lip, or both to provide different mounting options to accommodate different sites. The frame may comprise a plurality of frame members, such as extrusions including the air vents.

20 Claims, 7 Drawing Sheets

VENTILATED PHOTOVOLTAIC MODULE FRAME

BACKGROUND OF THE INVENTION

1. Field of the Invention

The present invention relates generally to photovoltaic cells, and more particularly but not exclusively to frames for mounting photovoltaic modules.

2. Description of the Background Art

Photovoltaic cells, also known as "solar cells," are well known devices for converting solar radiation to electrical energy. Photovoltaic cells are employed in both space and terrestrial applications. Photovoltaic cells in space applications include those used in spacecrafts and satellites. In terrestrial applications, photovoltaic cells are employed as power sources for a variety of things including electronic devices, vehicles, and buildings. Photovoltaic cells may be arranged into an array and packaged as a module.

Photovoltaic modules are typically installed on the rooftop when employed as a power source for a building. In that application, regardless of whether the building is for residential or commercial use, it is important that the photovoltaic modules are installed such that they are structurally sound, operate at rated efficiencies, and aesthetically pleasing. It is also important for the photovoltaic modules to be relatively easy to ship and install.

SUMMARY

In one embodiment, a photovoltaic frame assembly comprises a photovoltaic module and a frame having a plurality of air vents. The air vents allow air to flow into the frame and thereby cool the photovoltaic module. The frame may be installed in-line with another such frame to allow air flow between frames. The air vents may be located within a perimeter of the frame to allow for structural integrity while remaining aesthetically pleasing. The frame may include an inner lip, an outer lip, or both to provide different mounting options to accommodate different sites. The frame may comprise a plurality of frame members, such as extrusions including the air vents.

These and other features of the present invention will be readily apparent to persons of ordinary skill in the art upon reading the entirety of this disclosure, which includes the accompanying drawings and claims.

The use of the same reference label in different drawings indicates the same or like components. Drawings are not necessarily to scale unless otherwise noted.

DETAILED DESCRIPTION

In the present disclosure, numerous specific details are provided, such as examples of apparatus, components, and method, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
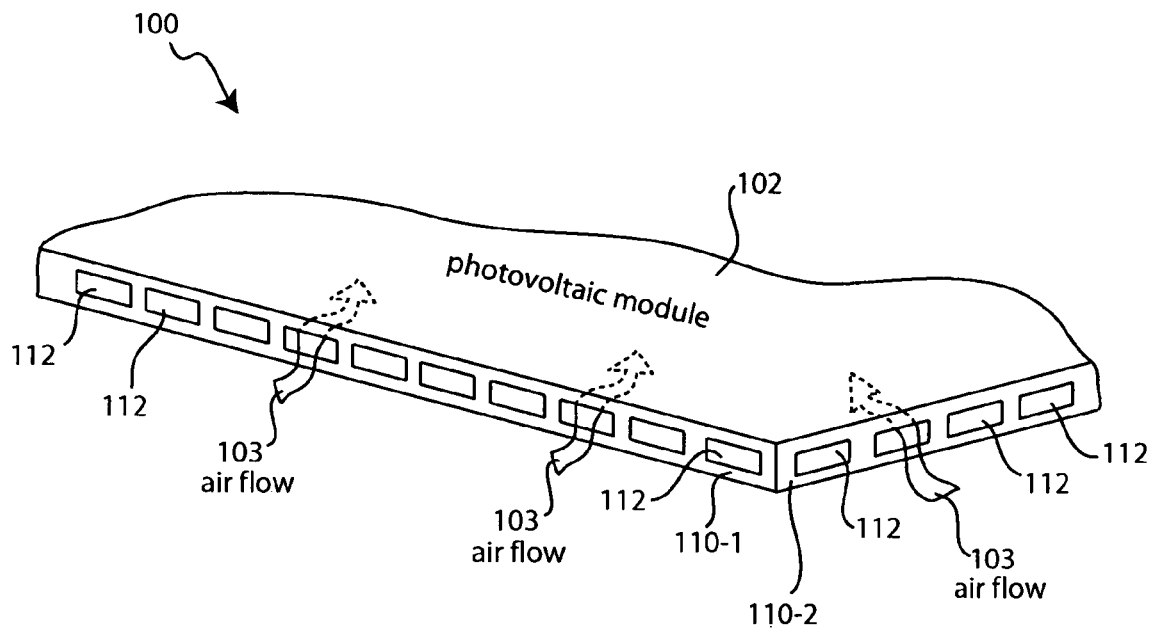
FIG. 1 shows a schematic diagram of a photovoltaic assembly 100 in accordance with an embodiment of the present invention.

FIG. 1 shows a schematic diagram of a photovoltaic assembly 100 in accordance with an embodiment of the present invention. Assembly 100 includes a photovoltaic module 102 and a frame, which may comprise a plurality of frame members. In the example of FIG. 1, the frame members are extrusions 110 (i.e., 110-1, 110-2, . . . ). Photovoltaic module 102 comprises an array of photovoltaic cells. A glass laminate may be placed over the photovoltaic cells for environmental protection. In one embodiment, the photovoltaic cells advantageously comprise backside-contact cells, such as those of the type available from Sunpower Corporation of Sunnyvale, Calif. In a backside-contact cell, wirings leading to external electrical circuits are coupled on the backside (i.e., the side of the cell facing away from the sun) of the cell for increased area for solar collection. Backside-contact cells are also disclosed in U.S. Pat. Nos. 5,053,083 and 4,927,770, which are both incorporated herein by reference in their entirety. Other types of photovoltaic cells may also be used without detracting from the merits of the present invention.

Extrusions 110, which serve as frame members, form a frame surrounding photovoltaic module 102. The resulting frame may support photovoltaic module 102 along its edges as shown in FIG. 1. This not only increases the aesthetic aspects and structural integrity of the frame, but also helps protect components in the interior of the frame. Photovoltaic module 102 may already be framed with extrusions 110 when shipped from the factory. This helps protect photovoltaic module 102 during shipping and also allows for relatively easy installation of the photovoltaic module at the installation site. Depending on the application, extrusions 110 may also be assembled with photovoltaic module 102 at the installation site. In one embodiment, an extrusion 110 comprises extruded aluminum. Other materials or fabrication processes may also be employed to fabricate an extrusion 110. For example, an extrusion 110 may alternatively be molded plastic (e.g., injection molded), pultruded plastic (glass reinforced), reaction injected molded plastic, or welded metal assembly.

An extrusion 110 may include a plurality of air vents 112 for allowing air to flow into or out of the frame. Only a few of air vents 112 are labeled in FIG. 1 and in other drawings for clarity of illustration. Arrows 103, which represent air flow, are shown as going into the frame in FIG. 1. Of course, air flow may also go in a direction opposite to that shown by arrows 103. Air vents 112 advantageously allow cooling of assembly 100. This helps keep the photovoltaic module relatively cool, which helps the photovoltaic cells retain their rated efficiencies.

In one embodiment, air vents 112 comprise cutouts within the perimeter (i.e. not touching the edges) of an extrusion 110. Forming the air vents 112 within the perimeter of an extrusion 110 advantageously allows a plurality of air vents 112 to be formed without compromising the structural integrity of the extrusion. This helps extrusions 110 frame and support a photovoltaic module 102 without necessarily having to have another support within the frame. That is, extrusions 110 may be employed as the sole structure supporting a photovoltaic module 102 over a rooftop. Depending on the application, air vents 112 may also comprise cutouts touching an edge of an extrusion 110.

Another advantage of incorporating air vents 112 in an extrusion 110 is that the frame formed by extrusions 110 may be placed substantially close to a plane of a roof. For example, the frame may be installed flushed or relatively close to the roof and still allow air to flow under photovoltaic module 102. This allows cooling of photovoltaic module 102, while remaining aesthetically pleasing. In contrast, prior techniques for installing a photovoltaic module simply jack the photovoltaic module over the roof without using a frame. Such prior techniques leave an unsightly gap between the roof and the photovoltaic module and expose components under the photovoltaic module.

Figure 2:
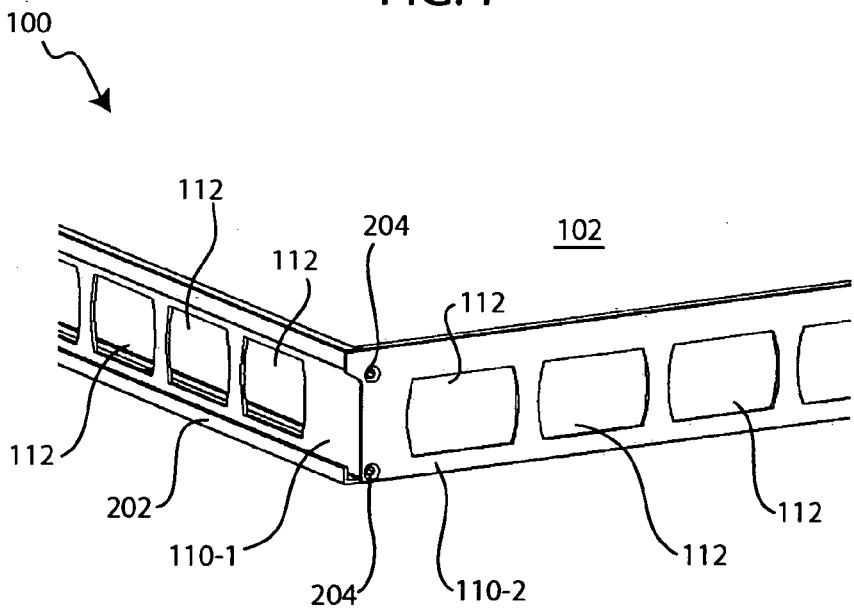
FIG. 2 shows a closer view of extrusions framing a photovoltaic module in accordance with embodiment of the present invention.

FIG. 2 shows a closer view of extrusions 110 framing photovoltaic module 102 in accordance with embodiment of the present invention. In the example of FIG. 2, extrusion 110-1 is joined to extrusion 110-2 by fasteners 204. A fastener 204 may be a screw or a bolt, for example. An extrusion 110 may have an outer lip 202. As will be more apparent below, an outer lip 202 may be employed to attach an extrusion 110 to the roof. FIG. 2 also shows air vents 112 previously discussed in connection with FIG. 1.

Figure 3A:
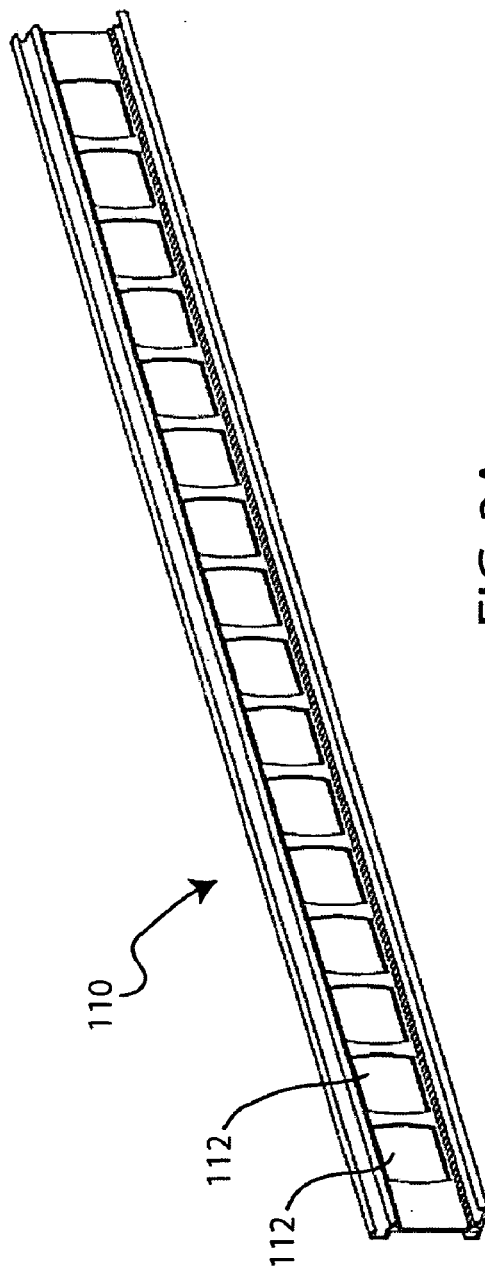
FIGS. 3A and 3B show a prospective view and a front view, respectively, of an extrusion with air vents in accordance with an embodiment of the present invention.
Figure 3B:
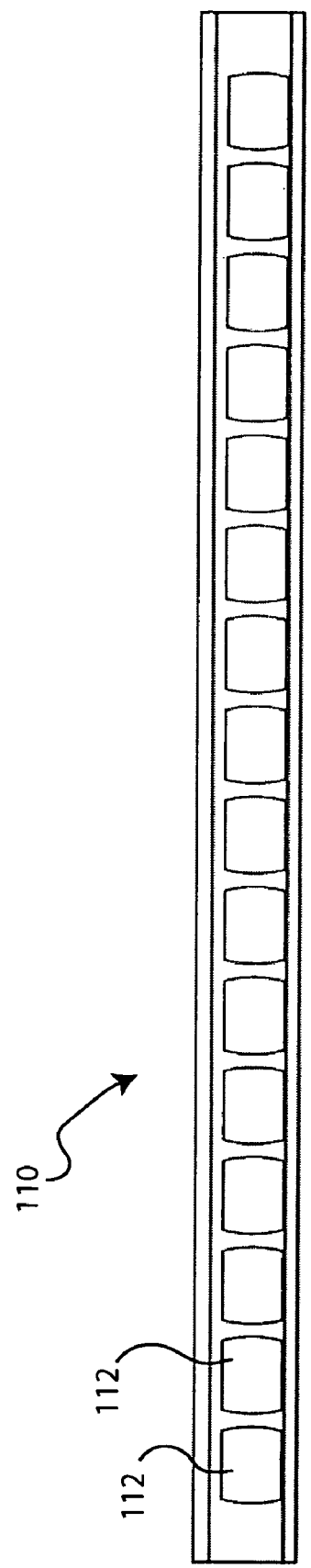

FIGS. 3A and 3B show a prospective view and a front view, respectively, of an extrusion 110 with air vents 112 in accordance with an embodiment of the present invention.

Figure 4:
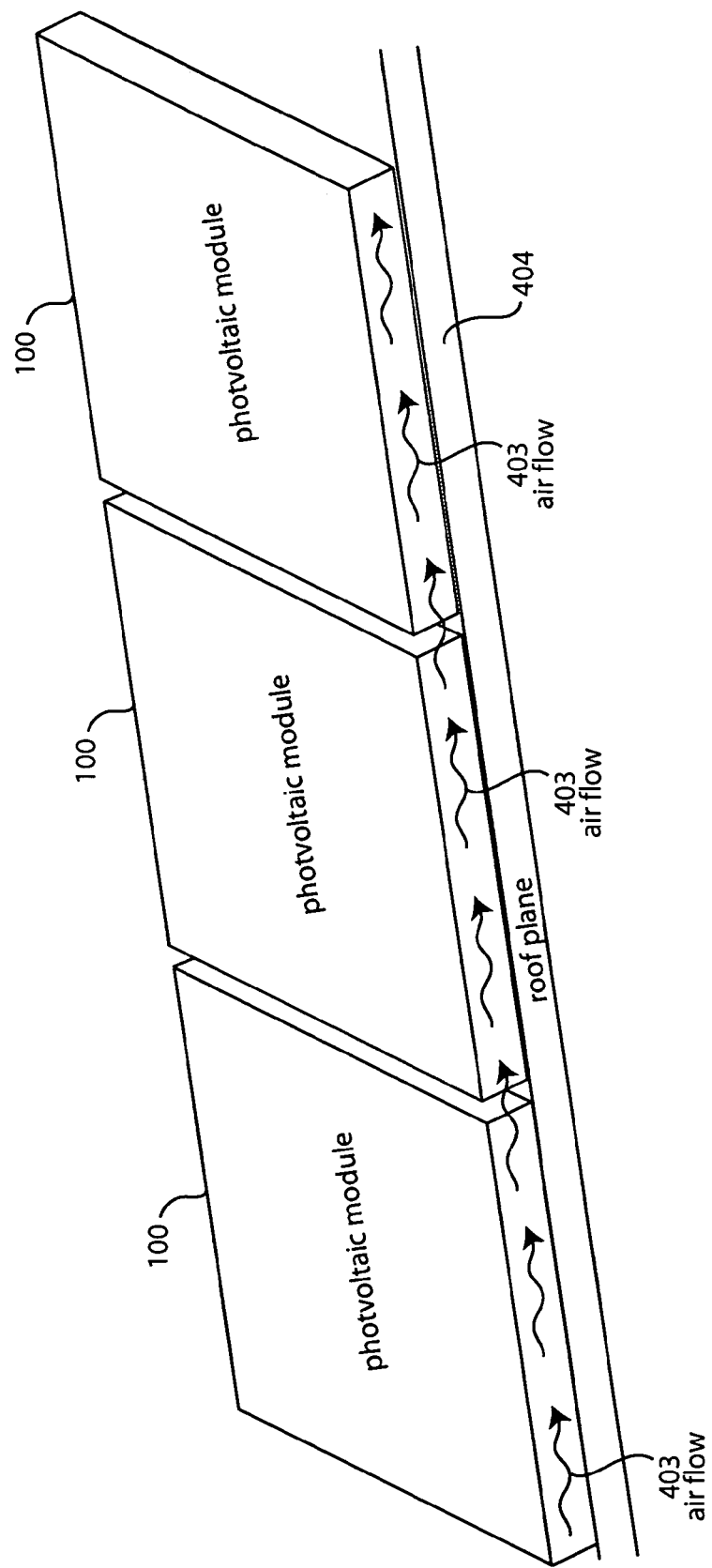
FIG. 4 shows an arrangement of photovoltaic module assemblies in accordance with an embodiment of the present invention.

FIG. 4 shows an arrangement of photovoltaic module assemblies in accordance with an embodiment of the present invention. In the example of FIG. 4, photovoltaic module assemblies 100 are arranged in line such that air flows from one photovoltaic module assembly to another through air vents 112 (not shown) as indicated by arrows 403. This results in air flow under the photovoltaic modules, thereby cooling them. As shown in FIG. 4, photovoltaic module assemblies 100 may be installed flushed or relatively close to a roofing plane 404. Roofing plane 404 may be a rooftop surface of a dwelling, which may be commercial or residential.

Using a plurality of extrusions to form a photovoltaic module frame with air vents advantageously simplifies the manufacturing, shipping, and assembly of the frame. It is to be understood, however, that the frame may also comprise a single piece with a top or bottom opening, for example. The frame may also have any number of pieces and not necessarily four as in the provided examples. The frame may have frame members other than extrusions. Such frame members or framing may incorporate air vents, and mounting portions similar to the presently disclosed extrusions.

Figure 5:
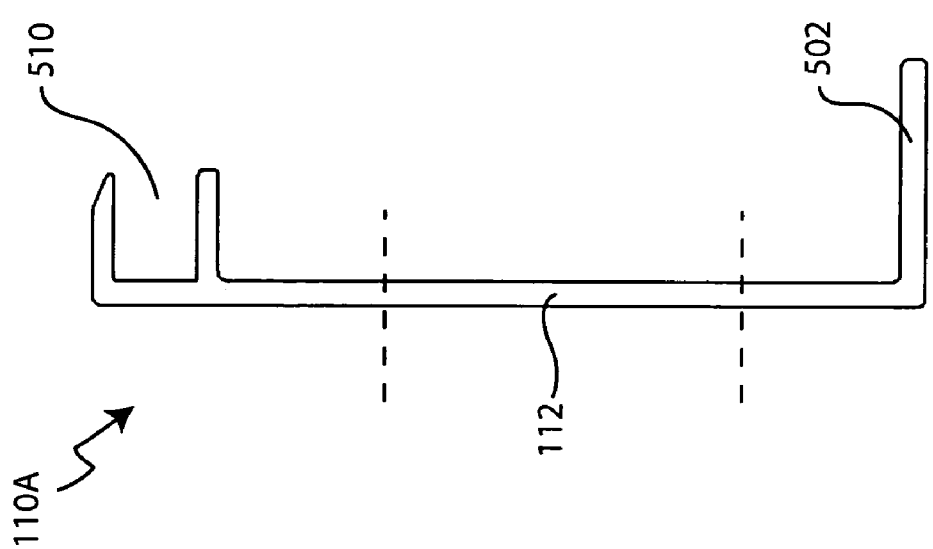
FIG. 5 shows an extrusion in accordance with an embodiment of the present invention.

FIG. 5 shows an extrusion 110A in accordance with an embodiment of the present invention. Extrusion 110A is a specific implementation of an extrusion 110. In the example of FIG. 5, extrusion 110A includes a slot 510, an inner lip 502, and a plurality of air vents 112. An edge of a photovoltaic module 102 may be inserted into slot 510 for support. Inner lip 502 may be fastened to a roofing plane using a bolt, a screw, or a clip, for example. Inner lip 502 faces the interior of a frame formed by a plurality of extrusions 110A.

Figure 6:
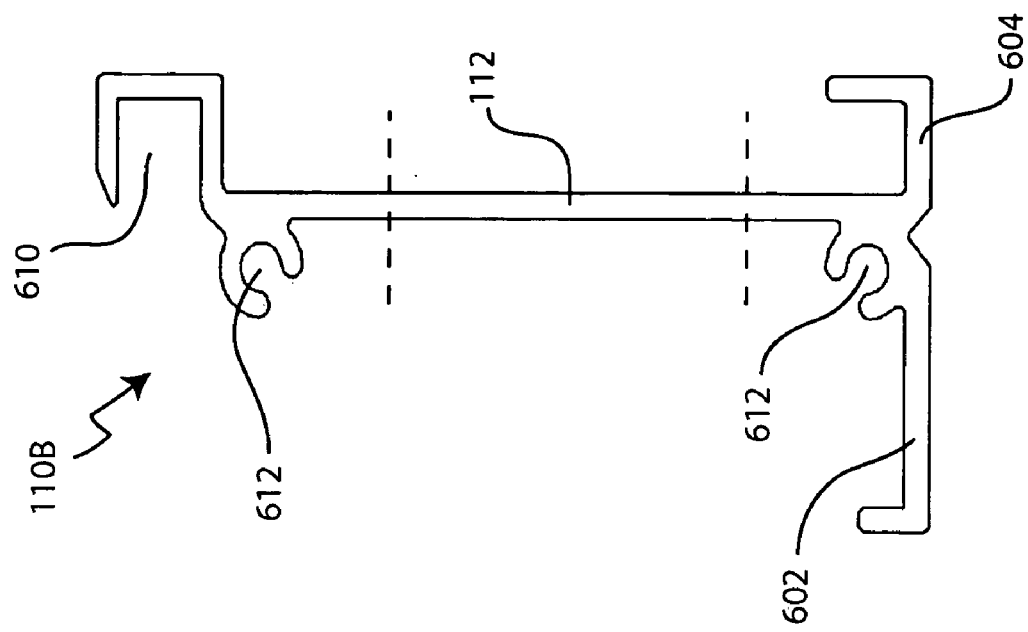
FIG. 6 shows an extrusion in accordance with an embodiment of the present invention.

FIG. 6 shows an extrusion 110B in accordance with embodiment of the present invention. Extrusion 110B is a specific implementation of an extrusion 110. In the example of FIG. 6, extrusion 110B includes a slot 610, an inner lip 602, an outer lip 604, channels 612, and air vents 112. An edge of a photovoltaic module 102 may be inserted into slot 610 for support. Inner lip 602 and outer lip 604 may be fastened onto a roofing plane using a bolt, a screw, or a clip, for example. Inner lip 602 and outer lip 604 face the interior and exterior, respectively, of a frame formed by a plurality of extrusions 110B. As shown in FIG. 6, inner lip 602 and outer lip 604 may be oppositely located. Inner lip 602 and outer lip 604 advantageously allow for different mounting options to accommodate different installation sites. An extrusion 110B may further include channels 612 running along a length of the extrusion 110B. Channels 612 provide an anchor for self-tapping screws (e.g., fastener 204 shown in FIG. 2) that are inserted through holes in an extrusion being used as an end piece (e.g., extrusion 110-2 shown in FIG. 2).

Figure 7:
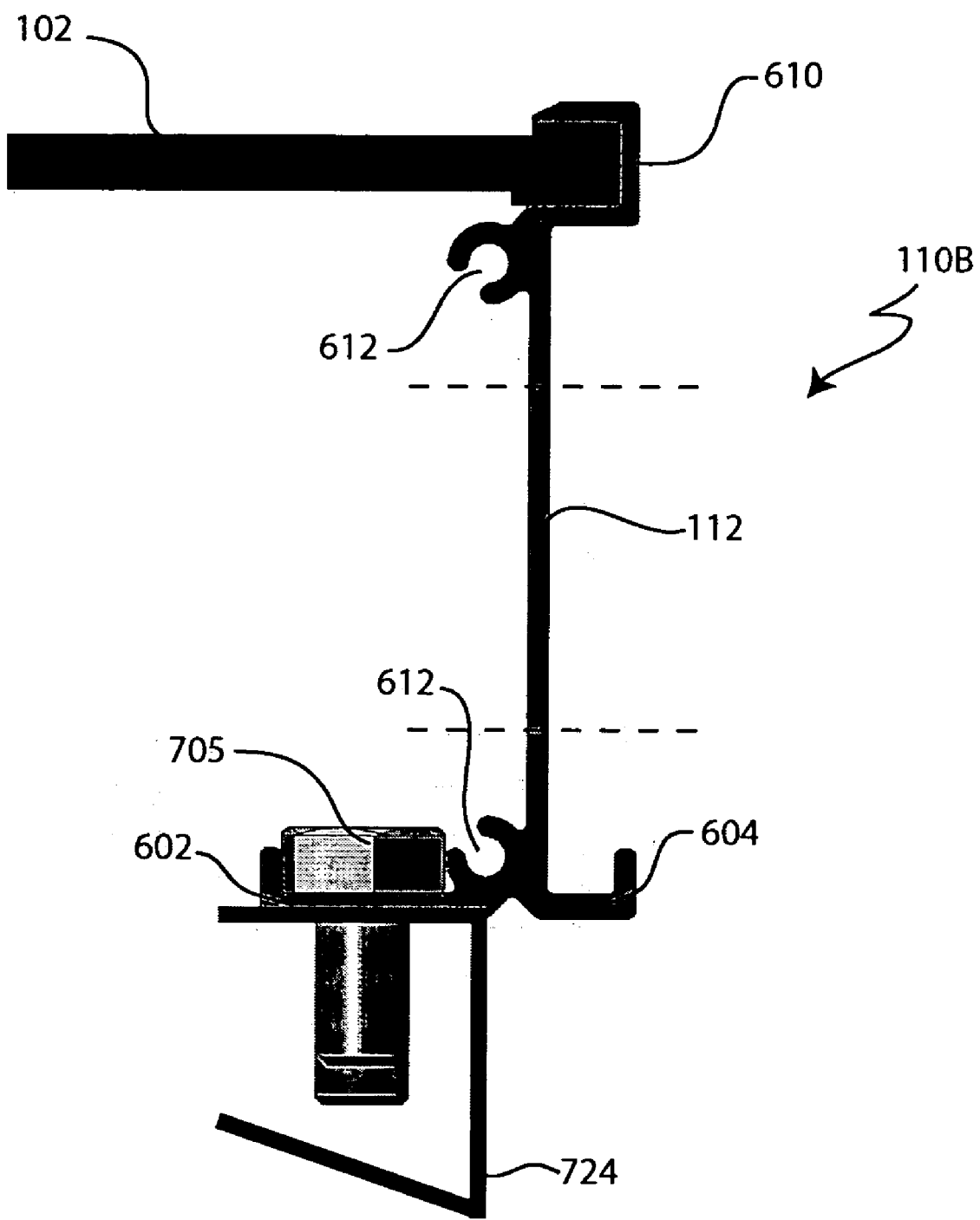
FIG. 7 shows an extrusion mounted using an inner lip in accordance with an embodiment of the present invention.

FIG. 7 shows an extrusion 110B mounted using an inner lip 602 in accordance with an embodiment of the present invention. In the example of FIG. 7, extrusion 110B is mounted to a structure 724, which in turn may be mounted to the roof. Structure 724 may be a tilted support rack or other substructure, for example. Extrusion 110B may be mounted to structure 724 using a fastener 705, which may be a screw or a bolt, for example. FIG. 7 shows the extrusion 110B supporting a photovoltaic module 102 by the edge. The other components labeled in FIG. 7 have already been discussed in connection with FIG. 6.

Figure 8:
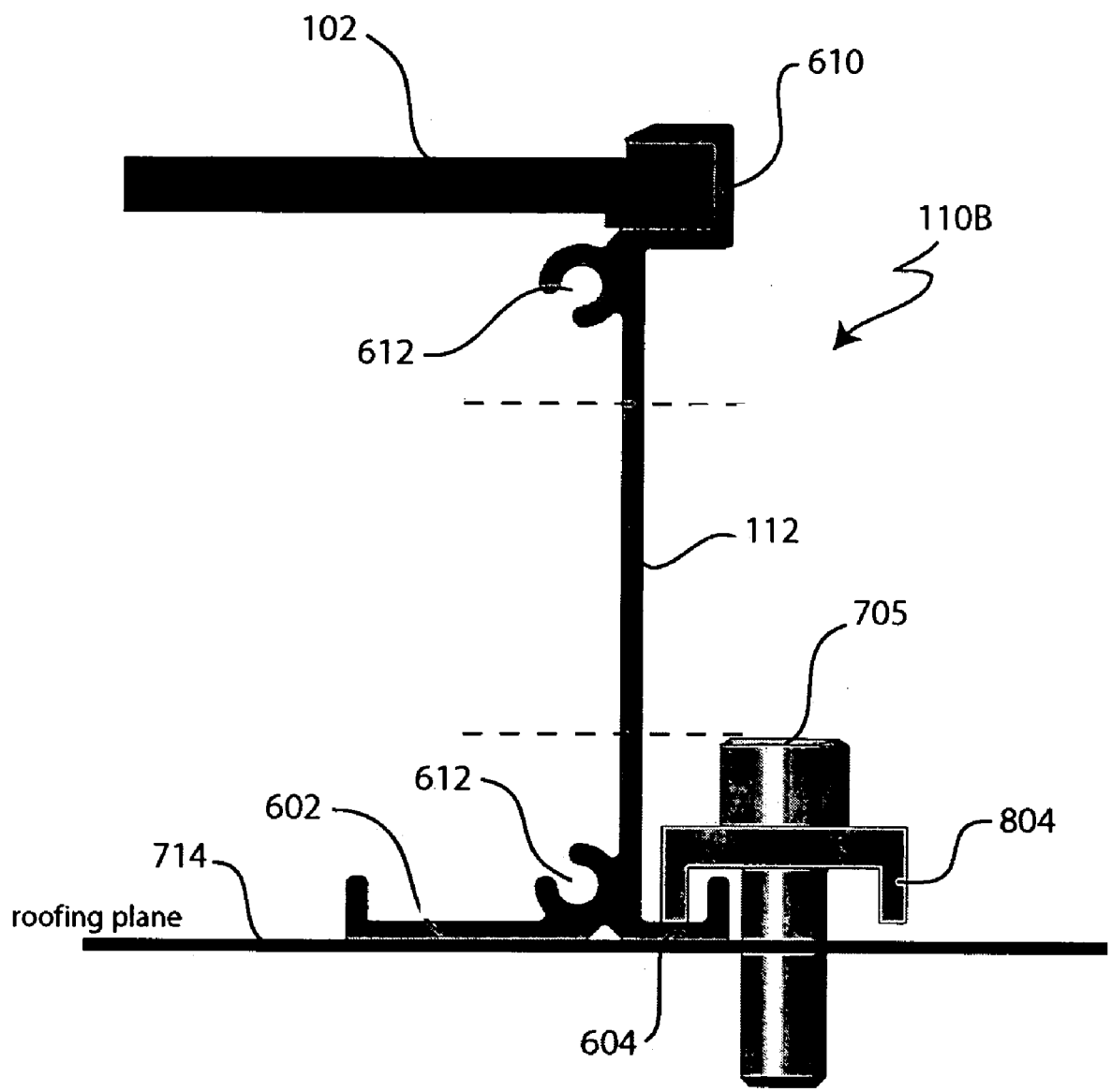
FIG. 8 shows an extrusion mounted using an outer lip in accordance with an embodiment of the present invention.

FIG. 8 shows an extrusion 110B mounted using an outer lip 604 in accordance with an embodiment of the present invention. In the example of FIG. 8, extrusion 110B is flushed mounted to a roofing plane 714 by mounting hardware comprising a clip 804 and a fastener 705. Clip 804 clamps outer lip 604 to roofing plane 714. FIG. 8 shows the extrusion 110B supporting a photovoltaic module 102 by the edge. The other components labeled in FIG. 8 have already been discussed in connection with FIG. 6.

Figure 9:
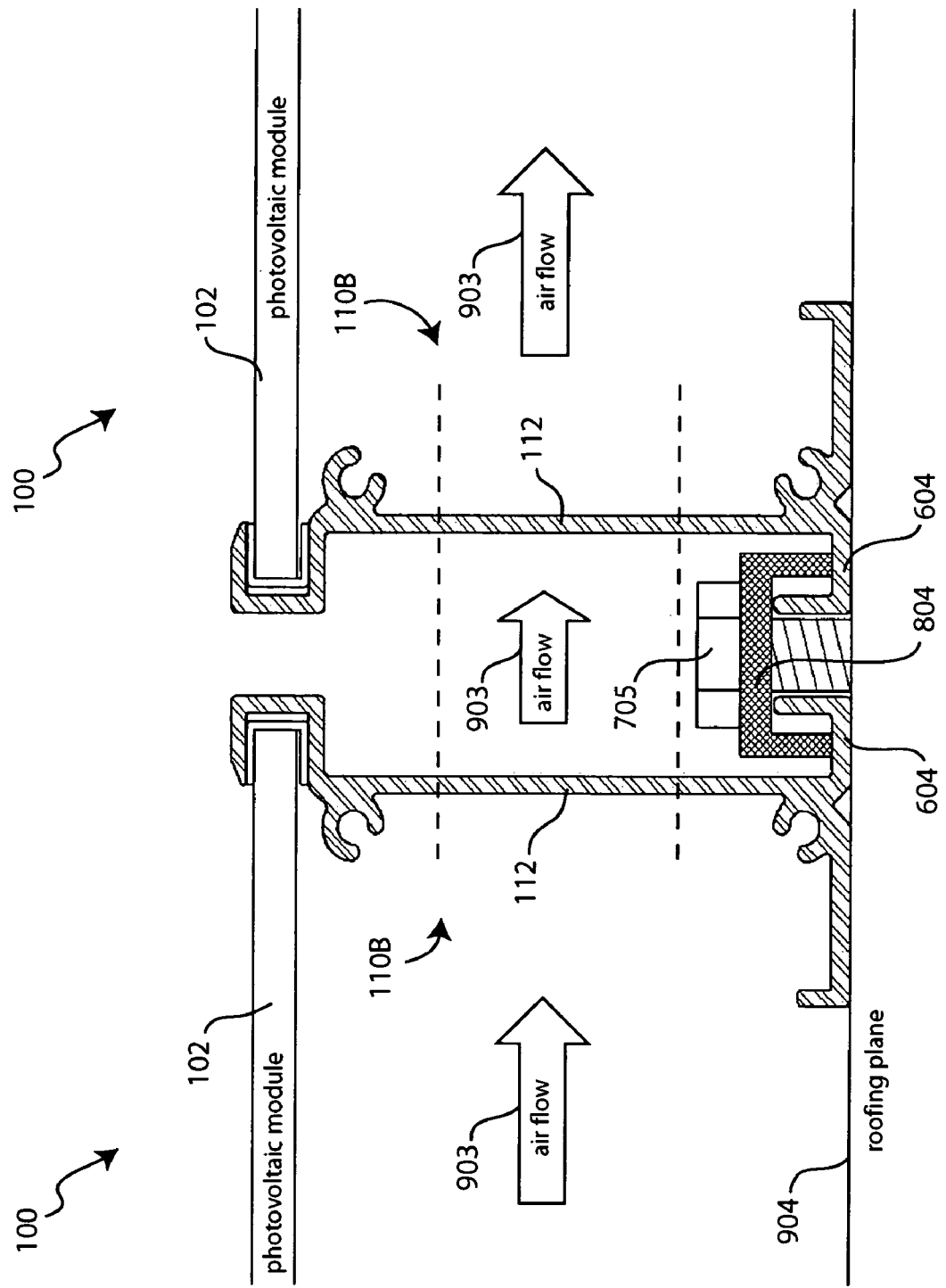
FIG. 9 shows an arrangement of photovoltaic module assemblies in accordance with an embodiment of the present invention.

FIG. 9 shows an arrangement of photovoltaic module assemblies 100 in accordance with an embodiment of the present invention. In the example of FIG. 9, a mounting hardware comprising a clip 804 and a fastener 705 attaches two photovoltaic module assemblies 100 to a roofing plane 904. Clip 804 may clamp the outer lips 604 of the extrusions 110B of the photovoltaic module assemblies 100 together. Air may flow through air vents 112 from one photovoltaic module assembly 100 to another as indicated by arrows 903. This advantageously cools the photovoltaic modules 102 from underneath.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. An apparatus for mounting a photovoltaic module frame on a roof, the apparatus comprising:

a first set of frame members forming a frame of a first photovoltaic module, each frame member in the first set on all sides of the frame having a plurality of air vents within a perimeter of each frame member and having a mounting portion configured to allow for attachment to a roof of a dwelling.

2. The apparatus of claim 1 wherein the mounting portion comprises:
an outer lip facing an exterior of the frame of the first photovoltaic module, the outer lip having a provision for roof attachment; and
an inner lip facing an interior of the frame of the first photovoltaic module, the inner lip having a provision for attachment to a structure that may be attached to a roof.

3. The apparatus of claim 2 wherein the outer lip is formed opposite to the inner lip.

4. The apparatus of claim 1 wherein the mounting portion comprises:
an outer lip facing an exterior of the frame of the first photovoltaic module, the outer lip having a provision for roof attachment.

5. The apparatus of claim 1 further comprising:
a second set of frame members forming a frame of a second photovoltaic module, each frame member in the second set having a plurality of air vents within a perimeter of each frame member and having a mounting portion configured to allow for attachment on the roofing plane, wherein the frame of the second photovoltaic module is in-line with the frame of the first photovoltaic module such that air flows from under the first photovoltaic module to under the second photovoltaic module through air vents.

6. The apparatus of claim 5 further comprising:
a mounting hardware attaching an outer lip of a frame member in the first set and an outer lip of a frame member in the second set to a roofing plane.

7. The apparatus of claim 6 wherein the mounting hardware comprises:
a clip clamping an outer lip of a frame member in the first set and an outer lip of a frame member in the second set.

8. The apparatus of claim 1 wherein each frame member in the first set further comprises:
a slot for accepting and supporting an edge of the first photovoltaic module.

9. The apparatus of claim 8 wherein the slot runs along a length of a frame member.

10. The apparatus of claim 1 wherein each frame member in the first set comprises:
an extruded material.

11. The apparatus of claim 1 wherein the photovoltaic module comprises an array of backside-contact photovoltaic cells.

12. A photovoltaic module assembly comprising:
a photovoltaic module;
a rectangular frame surrounding and supporting the photovoltaic module, the frame having a plurality of air vents within a perimeter of the frame on all sides of the frame and having a mounting portion configured to allow attachment of the frame to a roof on all sides of the frame.

13. The photovoltaic module assembly of claim 12 wherein the frame further comprises:
an outer lip facing outward of the frame, the outer lip being configured to allow attachment of the frame to the roof and to allow attachment of the frame to another frame.

14. The photovoltaic module assembly of claim 12 wherein the frame further comprises:
an inner lip facing an interior of the frame, the inner lip being configured to allow attachment of the frame to a substructure that may be attached to the roof.

15. The photovoltaic module assembly of claim 12 wherein the frame comprises:
a plurality of extrusions including the air vents.

16. The photovoltaic module assembly of claim 12 wherein the frame is attached to a substructure that is attached to the roof.

17. The photovoltaic module assembly of claim 12 wherein the photovoltaic module comprises an array of backside-contact photovoltaic cells.

18. A method of installing photovoltaic modules on a roof, the method comprising:
framing a first photovoltaic module with a plurality of frame members to form a first frame having a plurality of air vents on all sides of the first frame;
framing a second photovoltaic module with a plurality of frame members to form a second frame having a plurality of air vents on all sides of the second frame; and
installing the first and second photovoltaic modules on a roof such that air flows through frame members of the first photovoltaic module and into frame members of the second photovoltaic module.

19. The method of claim 18 wherein installing the first and second photovoltaic modules comprise:
clamping an outer lip of a frame member framing the first photovoltaic module together with an outer lip of a frame member framing the second photovoltaic module.

20. The method of claim 18 wherein each frame member framing the first and second photovoltaic modules comprises extruded aluminum.

* * * * *